United States Patent [19]
Barton et al.

[11] Patent Number: 5,757,425
[45] Date of Patent: May 26, 1998

[54] METHOD AND APPARATUS FOR INDEPENDENTLY CALIBRATING LIGHT SOURCE AND PHOTOSENSOR ARRAYS

[75] Inventors: James Thomas Barton, Fairport; Sabet Kamel Salib, Rochester, both of N.Y.

[73] Assignee: Eastman Kodak Company, Rochester, N.Y.

[21] Appl. No.: 574,707

[22] Filed: Dec. 19, 1995

[51] Int. Cl.$^6$ .................................................. H04N 3/14
[52] U.S. Cl. ...................... 348/241; 364/571.05; 250/205
[58] Field of Search ........................... 348/241, 294, 348/250, 246; 364/571.01, 571.05, 579; 250/252.1 R, 205, 553

[56] References Cited

U.S. PATENT DOCUMENTS

| | | | |
|---|---|---|---|
| 4,747,689 | 5/1988 | Aldred | 356/385 |
| 4,927,266 | 5/1990 | Sugiura et al. | 356/243 |
| 4,950,880 | 8/1990 | Hayner | 250/201.9 |
| 4,980,759 | 12/1990 | Smyth | 358/75 |
| 5,010,408 | 4/1991 | Toobey | 358/213.11 |
| 5,103,917 | 4/1992 | Moore | 172/6 |
| 5,117,400 | 5/1992 | Penn et al. | 367/128 |
| 5,160,981 | 11/1992 | Hirashima | 356/446 |
| 5,196,900 | 3/1993 | Pettersen | 356/141 |
| 5,204,733 | 4/1993 | Deshayes | 356/243 |
| 5,210,590 | 5/1993 | Landa et al. | 356/319 |
| 5,235,412 | 8/1993 | Boisvert et al. | 358/30 |
| 5,327,171 | 7/1994 | Smith et al. | 348/241 |
| 5,329,312 | 7/1994 | Boisvert et al. | 348/256 |
| 5,331,420 | 7/1994 | Yamano et al. | 348/246 |
| 5,340,974 | 8/1994 | Zalewski | 250/205 |
| 5,515,102 | 5/1996 | Pearsall et al. | 348/241 |
| 5,631,466 | 5/1997 | Botti et al. | 250/571.05 |

FOREIGN PATENT DOCUMENTS

| | | |
|---|---|---|
| 0 444 689 A2 | 2/1991 | European Pat. Off. |
| 5347189 | 12/1993 | Japan |
| WO 93/03793 | 8/1992 | WIPO |

*Primary Examiner*—Wendy Garber
*Attorney, Agent, or Firm*—Edward Dugas

[57] ABSTRACT

A method of calibrating an image sensor having an array of pixel sensor sites, and an area light source having a corresponding array of pixel emission sites, comprising the steps of:

a. measuring the output of the light source in a first region with a radiometer to generate an absolute measured light value;

b. identifying a first region of the image sensor corresponding to the first region of the light source;

c. successively positioning, reading out, and stepping the image sensor with respect to the light source to create a first file of pixel values representing one pixel in the first region of the sensor that has read every pixel in the first region of the source, and a second file of pixel values representing one pixel in the source that has been read by every pixel in the first region of the sensor;

d. calibrating each pixel in the first region of the light source using the absolute measured light value and the pixel values in the first file;

e. calibrating each pixel in the first region of the sensor using the calibrated value of one pixel in the first region of the light source and the pixel values in the second file; and f. repositioning the sensor with respect to the light source and calibrating an uncalibrated second region of sensor with the calibrated first region of the source, and calibrating an uncalibrated second region of the light source with the calibrated first region of the sensor.

12 Claims, 9 Drawing Sheets

METHOD AND APPARATUS FOR INDEPENDENTLY CALIBRATING LIGHT SOURCE AND PHOTOSENSOR ARRAYS

FIELD OF THE INVENTION

This invention relates to the calibration of one or two dimensional photosensor arrays and/or light sources for imaging applications.

BACKGROUND OF THE INVENTION

Image Sensor Array Technology

Recent years have seen the rapid development of photosensor arrays, e.g. charge coupled device (CCD) arrays and charge injection device (CID) arrays, for electronic imaging of an image or scene. Because of their many advantages (small size, low power, low cost, etc.), imaging or photosensor arrays of CCD or CID cells have become the imaging units of choice in many applications such as consumer camcorders. And as the performance and quality of such photosensor arrays improves, they are being used more and more in various imaging systems requiring high resolution, full color balance, wide dynamic range, low-light sensitivity, and high frequency response such as is required by high definition television (HDTV) or as needed in instruments used for astronomical observations where incident light levels are extremely low.

For simplification of the following description, references to image sensor arrays or photosensor arrays or imaging arrays or CCD or CID arrays or cells will encompass all such arrays or cells unless the discussion otherwise specifically states a restricted meaning of the term used.

A photosensor array typically has horizontal rows and vertical columns arranged in an X and Y pattern of light-sensing cells within a given area onto which an image of a scene is optically focused. By way of example, there may be about a thousand or more CCD cells in each vertical column and a thousand or more CCD cells in each horizontal row for a total of a million or more CCD cells within an area which may be only one or a few square centimeters. Each CCD cell represents and occupies a very small area, termed a pixel or photosite, of the total array. The more pixels present in a CCD array of a given overall area, the finer the resolution or grain (or lack thereof) in the image that may be reproduced by exposure to the CCD array. For prospective HDTV applications, about two million pixels per image area of a CCD array are proposed, and the pixel signals are sampled and outputted from the unit as analog image signal voltages to a signal processor at about a 40 MHz rate. This is a much higher rate than is required, for example, a present day color television system, operating in accordance with the national television standards committee (NTSC) requirements, uses only about one-quarter million pixels. This high speed of 40 MHz is difficult to achieve along with very low noise, good color balance, and linearity over a wide dynamic range.

The light sensing cells at each pixel of such solid state CCD imaging arrays typically include a photosensor, i.e., a photodiode, and an associated CCD cell (a CCD pixel). The photosensor may be part of the physical structure of the CCD cell or physically separated from and electrically connected to the CCD cell. In either case, the photosensitive layers of the CCD pixels are formed over pixel areas of the CCD array surface upon which light of an image to be scanned is cast. A charge domain signal typically originates from photogenerated electrons captured in the photosensor over a known time. The charge is then transferred to the associated CCD cell and held as a charge packet. The array clock then transfers the charge packet in the CCD cell toward an array output circuit where the charge is transformed into a voltage. The voltage is read out at a system clock speed and is processed in analog fashion to form a video signal or digitized and employed in a variety of imaging contexts. In either case, the voltage signal is referred to herein as the pixel signal.

There are certain characteristics of a CCD photo-imaging unit which must be compensated for by the electronic analog signal circuitry which receives and processes the pixel signals produced by the CCD array in order to obtain a high quality image. The electrical signal stored at each CCD cell is related to the intensity of the light of an image at a given instant incident on the cell's photosensitive pixel area. The individual, electrically isolated, CCD cells are made with photosensitive faces that are very small (e.g., about 5 microns square) in order to obtain a high resolution array of up to two million pixels. As a consequence, each CCD cell has a high impedance, and the pixel signals generated over the operating range are relatively small. Therefore, thermal noise and switching transients within the CCD cells become significant factors effecting the quality of an image reproduced from the CCD array.

For full color imaging applications, the individual CCD cells of one or more CCD arrays are adapted by means of respective color masks (filters) applied over the cells to respond to respective color components of an image. For example, certain cells are covered with red (R) masks, other cells by green (G) masks, and the remaining cells by blue (B) masks. Thus the R, G and B color components of an image are separately detected by respective ones of the R, G and B cells in a CCD array. Alternatively, film scanning systems may employ three linear CCD sensor arrays with overlying R, G, and B filters, all mounted to a single substrate. Illuminated lines of the film image are successively focused on the three arrays.

Because of the differences in light transmittance of the green masks versus the red masks and the blue masks, the sensitivity of cells to green light is substantially greater than the sensitivity of the cells to red light or to blue light. The "green" cells generate (for a given "white", or balanced color image) substantially greater electrical output signals than do the "red" or the "blue" cells. It is necessary, therefore, to compensate for these differences in the R, G, and B signal outputs in order to obtain a proper "white balance" in an electronically reproduced image. Furthermore, when the R, G and B cells do not receive any light (total darkness), they still produce a small minimum "dark" signal voltage. The CCD cells themselves are all the same (only the color masks are different) and the "dark" (no light) signals are substantially the same for all of the cells in a given horizontal row of a CCD array. Compensation schemes for these characteristics in tri-color imaging applications are described in commonly assigned, U.S. Pat. Nos. 5,235,412 and 5,329,312.

Apart from these considerations, the operating specifications for high definition linear and area image CCD arrays for HDTV, image scanners, and other imaging applications are quite stringently defined to targeted values for a variety of operating characteristics, including imager responsivity. The deviation in performance of each CCD cell and the CCD array as a whole to target values for each characteristic should be determined for quality control purposes. Defective cells that do not provide any output signal response or provide too great a dark current response are readily identifiable by exposing the array to light or dark conditions and comparing the output signals of the CCD cells to a reference value. Maps of defective CCD cells are compiled during such testing to be supplied with the CCD array for an end use thereof. These "defect maps" are employed during subsequent signal processing to "fill in" pixel voltage signals from adjacent CCD cells for the defective cells if the defective CCD cells are not too great in number or concentrated in one area.

Photoresponse correction maps specific to each CCD cell in the CCD array are also desired for use in correction of each of the clocked out CCD pixel signals. Such correction is described, for example, in commonly assigned U.S. Pat. No. 5,086,343. As described therein, the output signal levels of the CCD cells of the CCD array vary from a specified value due to variations in the cell photoresponse and also due to light source non-uniformity. The conventional practice undertaken in the '343 patent and the prior art described therein is to employ a light source with state of the art spatial emission uniformity characteristics which is attained by design of the light source itself and temporal emission uniformity that is effected through feedback control. The effort to attain such light source characteristics and control is described in the following section. In the calibration process of the '343 patent, the assumption is made that the light source emission is as spatially uniform as can be attained and that the residual time varying intensities can be averaged out by accumulating and averaging a number, e.g. 255, frames of CCD cell signals, to derive a photoresponse correction map.

During the qualification testing of the response characteristics of a new CCD array design, the responsivity of each CCD cell to a range of light intensities and wavelengths is also typically determined in a test set-up that attempts to expose each cell to the same level of illumination. A measurement position is selected for the CCD cell under test with respect to the center of the illuminating light beam, and all CCD cell photosensors are theoretically exposed to the same portion of the light beam, depending on the accuracy of the incrementing stepper motor. The light source is not characterized or configured such that the actual pixel area of light falling on the CCD cell photosensor area under test is calibrated. Regulation of the intensity of the light beam to correct for time dependent variations is attempted using a feedback signal from a separate calibrated photodiode. However, the difference in surface area of the CCD cells under test and the photosensitive area of the calibration photodiode is ignored. Only the gross output of the light beam imaged onto the area of the reference photodiode is monitored so that any detected time dependent intensity changes can be recorded along with the pixel signals of the CCD elements for correction purposes. The tests do not establish an absolute or calibrated value of the light at the measurement position, and the true sensitivity of any individual CCD cell photosensor cannot be computed. At best, a relative variation in non-uniformities can be calculated.

In addition, the time that it takes to conduct the test for even a single wavelength and intensity renders it impractical in testing 100% of production runs of CCD arrays or other multi-pixel sensor or image arrays. A single test of a multi-million pixel array, sequencing at a rate of 100 pixels per second, would still take hours to complete. The above described tests are run to qualify prototypes of new designs or quality samples of production runs to specifications for the design.

Imaging Light Source Technology

As described above, the performance characteristics of CCD arrays are measured using a state of the art light source for imaging applications which do not necessarily require or relate to an associated light source in use, e.g., video or still cameras and HDTV or other electronic image displays employing CCD arrays. However, there are other applications, notably scanners, where CCD arrays, which are tested as described above, are combined with tightly defined light sources. In particular, telecine and still frame photographic film or other image bearing media scanners are described in the prior art for converting a scanned image into analog or digital images for further storage, processing, transmission, reproduction, and/or display applications.

In this regard, considerable effort has been undertaken to develop light sources which are tailored to provide a constant light intensity along a line or over an area particularly for reflective or transmissive illumination of an image bearing media to be coupled with linear or array sensors for detecting the intensity of the reflected or transmitted illumination and for determining a characteristic of the image from the intensity thereof. Such light sources are tailored for one or more characteristics, including brightness, color-temperature, coherence, diffusion, wavelength, uniformity in intensity over the line/area illuminated, etc.

In particular applications, images captured in photographic media are converted to digital data and stored on compact discs for readout and display as a video image, as exemplified by the KODAK® Photo-CD system, or reproduced employing various types of photographic or digital color printers. Movie films are scanned in telecine scanners for recording in other media or transmission in video format. In order to convert a photographic image into a set of analog or digital line data, each film image frame is transported through a film scanning station and illuminated with a light beam emitted through an image frame shaped aperture or, more typically, a narrow rectangular shaped aperture.

In a line scan configuration, the narrow rectangular aperture is closely spaced from the film transport path so that successive scan lines of the film image frames are illuminated as the film is advanced. The line of light transmitted through the film image frame is modulated by the scan line image content and directed upon high density, tri-color linear CCD arrays. Each CCD unit of the linear CCD arrays is theoretically imaged on or by a discrete transmitted light beam pixel having an intensity varying with the respective color transmissivity of the corresponding imaged pixel of the film and varying with the intensity of the emitted light beam pixel passing through it.

The linear light beam is typically produced by an elongated light source or by a light integrator that receives light from a discrete lamp(s) outside the light integrator, integrates the light by multiple reflections off diffusively reflective structure within the light integrator cavity, and emits it through the rectangular aperture. A wide variety of light integrator designs dedicated to making the linear light beam as uniform in intensity as possible are described in the literature. Various design considerations are taken into account to optimize the angular intensity profile and decrease flare in the emitted scan line of light. Such light integrators are intended to produce a line of diffuse, Lambertian light which has a uniform linear and angular distribution.

In addition to film scanning, such light sources and CCD arrays are also employed to scan other media or objects for quality inspection, wherein defects are located by the change in light intensity reflected or transmitted, or for other reasons. In such applications, area illumination light sources and CCD arrays may also be employed. Area light integrators may be formed with a spherical integrating cavity and employ ring shaped light sources surrounding a square or rectangular shaped aperture.

One of the goals such light integrator design is to achieve is to generate uniform light intensity and diffusion from each pixel of the entire aperture. Despite the best efforts to perfect the introduction or positioning of the source light and internal reflection patterns of the introduced light, the emitted light intensity is not absolutely uniform over the entire linear or area aperture for the light beam.

PROBLEMS TO BE SOLVED BY THE INVENTION

As the demands for high quality, i.e., high photoresponse uniformity, large scale, CCD and CID arrays are increasing, photoresponse correction maps of correction factors based on absolute photoresponse measurements would be highly desirable.

It may be realized that the above-described CCD array photoresponse testing and the image scanning technologies are interrelated insofar as in both cases the CCD cell photoresponses depend on the characteristics of the light source. A light source may be considered as constituting an array of individual light beam pixels emanating from corresponding emission sites or "E-sites". No matter how carefully the light source is designed or operated, the E-site intensities will vary over the light source array, and the varying intensities have an effect which can skew the photoresponse of the associated CCD (or CID) sensor cell pixels or "S-sites" during measurement of sensor cell responsivity or during use of a scanning system.

It will be realized from the above description of the process for mapping photoresponse of CCD cells of a linear or area CCD array, that the sequential process of isolating and measuring each cell's photoresponse, is tedious and only usable in the characterization of a new array design. In that process, care must be taken to ensure that each CCD cell is exposed to precisely the same light intensity or that the variation be measured and corrected for.

To the extent that production photosensor arrays are tested for photoresponse, the resulting measurement data of CCD cell responsivity is not calibrated in absolute terms and can only be used to identify defective CCD cells and to generate correction maps of correction factors.

It will also be realized that in the absence of a calibrated light source, such compiled correction factors only eliminate one variable in the use of a CCD array in a film or document scanner of the types described above. The actual photoresponses of the CCD cells or S-sites will still vary as a function of the deviations in intensity of the E-sites of the light source for illuminating the film or document.

While considerable effort has been undertaken to attempt to perfect CCD array technology and light source technology separately from one another, it has not been realized that considerable improvement may be achieved in correlation of absolute pixel calibrated light sources and photosensor arrays. There are no products, services, or methods currently available in light source technology today to fill this list of needs.

SUMMARY OF THE INVENTION

The present invention is directed to overcoming one or more of the problems set forth above. Briefly summarized, according to one aspect of the present invention, a method of calibrating an image sensor having an array of pixel sensor sites, and an area light source having a corresponding array of pixel emission sites, comprising the steps of:

a. measuring the output of the light source in a first region with a radiometer to generate an absolute measured light value;

b. identifying a first region of the image sensor corresponding to the first region of the light source;

c. successively positioning, reading out, and stepping the image sensor with respect to the light source to create a first file of pixel values representing one pixel in the first region of the sensor that has read every pixel in the first region of the source, and a second file of pixel values representing one pixel in the source that has been read by every pixel in the first region of the sensor;

d. calibrating each pixel in the first region of the light source using the absolute measured light value and the pixel values in the first file;

e. calibrating each pixel in the first region of the sensor using the calibrated value of one pixel in the first region of the light source and the pixel values in the second file; and f. repositioning the sensor with respect to the light source and calibrating an uncalibrated second region of sensor with the calibrated first region of the source, and calibrating an uncalibrated second region of the light source with the calibrated first region of the sensor.

It is therefore an object of the present invention to provide an improved method of rapidly and accurately mapping the photoresponse of an array of photosensors, particularly a CCD or CID array, to derive a correction table which is independent of the geometry of the light source used for calibration.

It is a further object of the present invention to provide an improved method of characterizing a light source in relation to such a photosensor array to achieve a mapping of the pixel-by-pixel photoemission of E-sites of the light source correlated to the photoresponse of the photosensor array, particularly a CCD array, for use in a scanning application.

It is a still further object of the present invention to map all E-sites of a light source for use as a calibrated light source for rapidly testing the photoresponses of S-sites of photosensor arrays to derive S-site correction maps.

It is a further object of this invention to combine the functions of calibrated emission and detection of radiation on a per-site basis to provide a Calibrated Emission Surface which monitors its in-plane performance and provides appropriate correction factors as conditions change.

This invention proposes a method and apparatus for accurately measuring all radiation from all emitter points of a light source by all detectors of a photosensor array, while eliminating the effects of stray radiation on each photo site.

The present invention further proposes to link this measuring process to a calibrated standard, such that both source and sensor planes can be radiometrically characterized on a pixel-by-pixel basis.

The above and other objects of the present invention will become more apparent when taken in conjunction with the following description and drawings wherein identical reference numerals have been used, where possible, to designate identical elements that are common to the figures.

ADVANTAGES OF THE INVENTION

The Calibrated Emission Surface (CES) can be both a tool and a product. As a tool, it becomes the basis or means of producing radiometrically calibrated linear and area-array photosensors, and as a product it becomes the basis for a new generation of light sources for scientific and industrial equipment. The Calibrated Sensor Surface (CSS) is a resultant product from either the creation, or the use, of the CES. It is any photosensitive surface which is S-site calibrated (i.e., calibrated on a pixel-by-pixel basis) from its interaction with the CES.

The CES and the CSS share several important features and advantages: each site region within the (sensor or emission) plane is (individually) radiometrically calibrated, and each S-site or E-site is only a few microns in size; S-site and E-site sizes are initially determined by the size of the pixels in the photosensor array, but these can be made smaller or larger as required; each site can have any amount of information associated with it, from a single radiometric response at a single wavelength, to a full bandwidth of responses over many wavelengths; and combined together, both the CES and the CSS can be designed into systems which are fault-tolerant, wherein performance changes with time or usage can be automatically identified and corrected.

As a result, numerous product and process possibilities exist for both pixel calibrated sources and photosensors within the rapidly emerging field of solid state emitter and photosensor array technologies. Lower cost CCD and CID sensor array production, rapid inspection, higher yields, and precise calibration are all realistic possibilities. Precise exposure systems for use as sub-systems supporting the imaging industry are also feasible. The combined use of a CES and a CSS, whether coupled by transmissive, reflective, or refractive means, can accelerate data collection by providing multiple parallel acquisition paths.

Under a specified set of conditions, any light source may be used to calibrate an array sensor on a pixel-by-pixel basis, resulting in a sensitivity map of each sensor site. That sensor array then becomes a stand-alone device for measuring impinging radiation from that source or any other source. Sensors are the measuring mechanism, and light sources are defined in terms of emission received by an array sensor at specified planes in space.

DETAILED DESCRIPTION OF THE INVENTION

Figure 1:
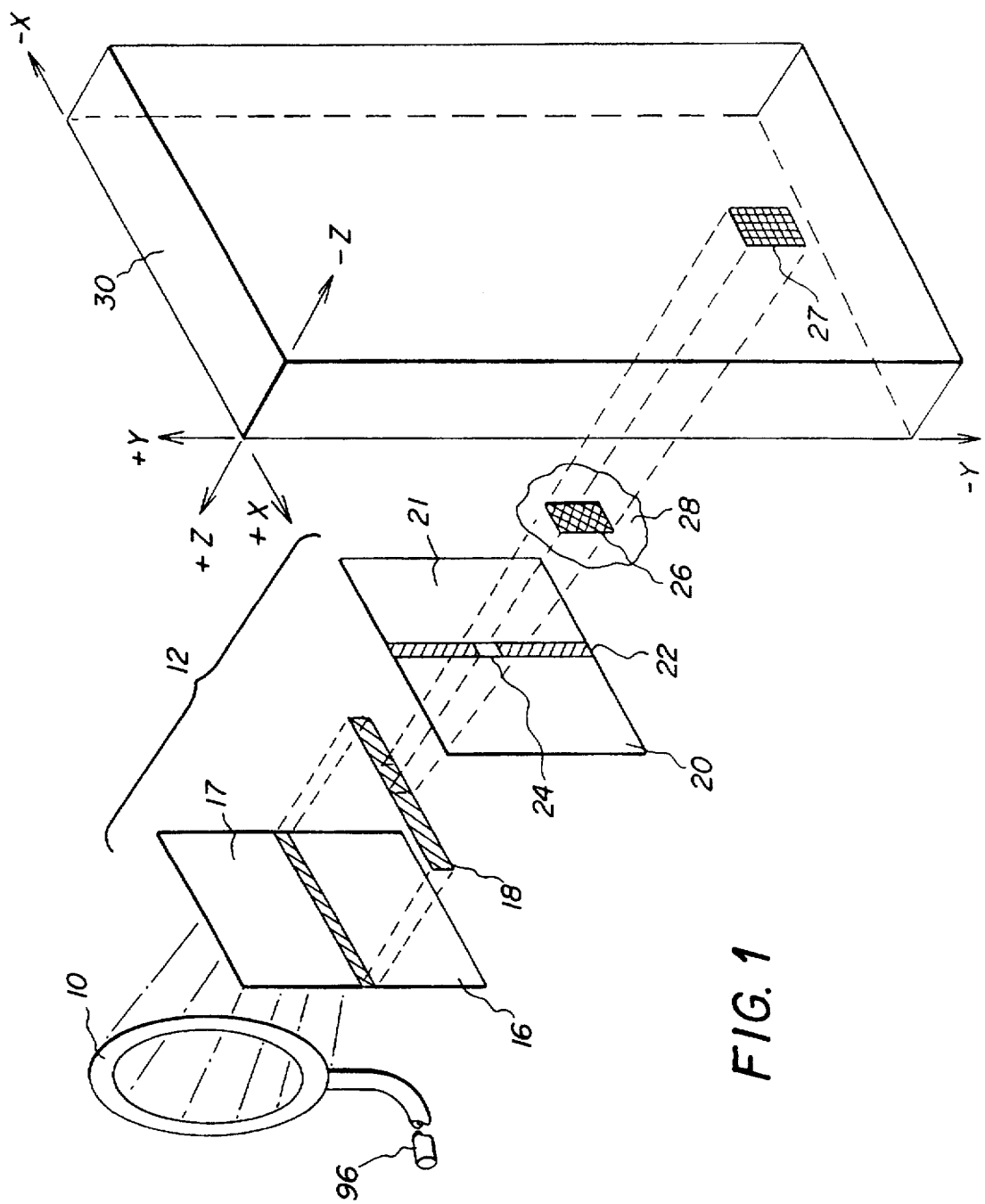
FIG. 1 is a perspective schematic diagram illustrating the orientation of an emission source and an adjustable aperture for use in defining an effective aperture and sensor plane of the calibration system and method of the present invention in a test set-up.

Referring to FIG. 1, a ring illuminator 10, receives light via an optical fiber 96 and emits that light towards an adjustable aperture assembly 12. The adjustable aperture assembly 12 passes a rectangular beam of illumination to the surface of a photosensor array 30, also known as the Sensor Under Test (SUT) illuminating those photosensors that are present in a rectangular area 27. The illuminated surface (rectangular area 27) of the photosensor is defined to be the effective aperture (EA). For purposes of visualization (more clearly seen), the effective aperture is displayed (projected) as EA 26, in a projected sensor plane 28. Although a rectangular aperture is shown and described hereafter, it will be understood that other aperture shapes and of course sizes, may be used. In any case, the adjustable aperture assembly 12 is comprised of first planar light plate pair 16–17 that defines a horizontal aperture 18 and a second planar light plate pair 20–21, that defines a vertical aperture 22. Each plate pair 16–17, and 20–21 is adjustable in width so as to define the size of the light beam that passes through the plate sets at an apertured opening 24. The size of the apertured opening 24 sets the size of the passed light beam which in turn defines the size of the effective aperture EA 26.

Figure 2:
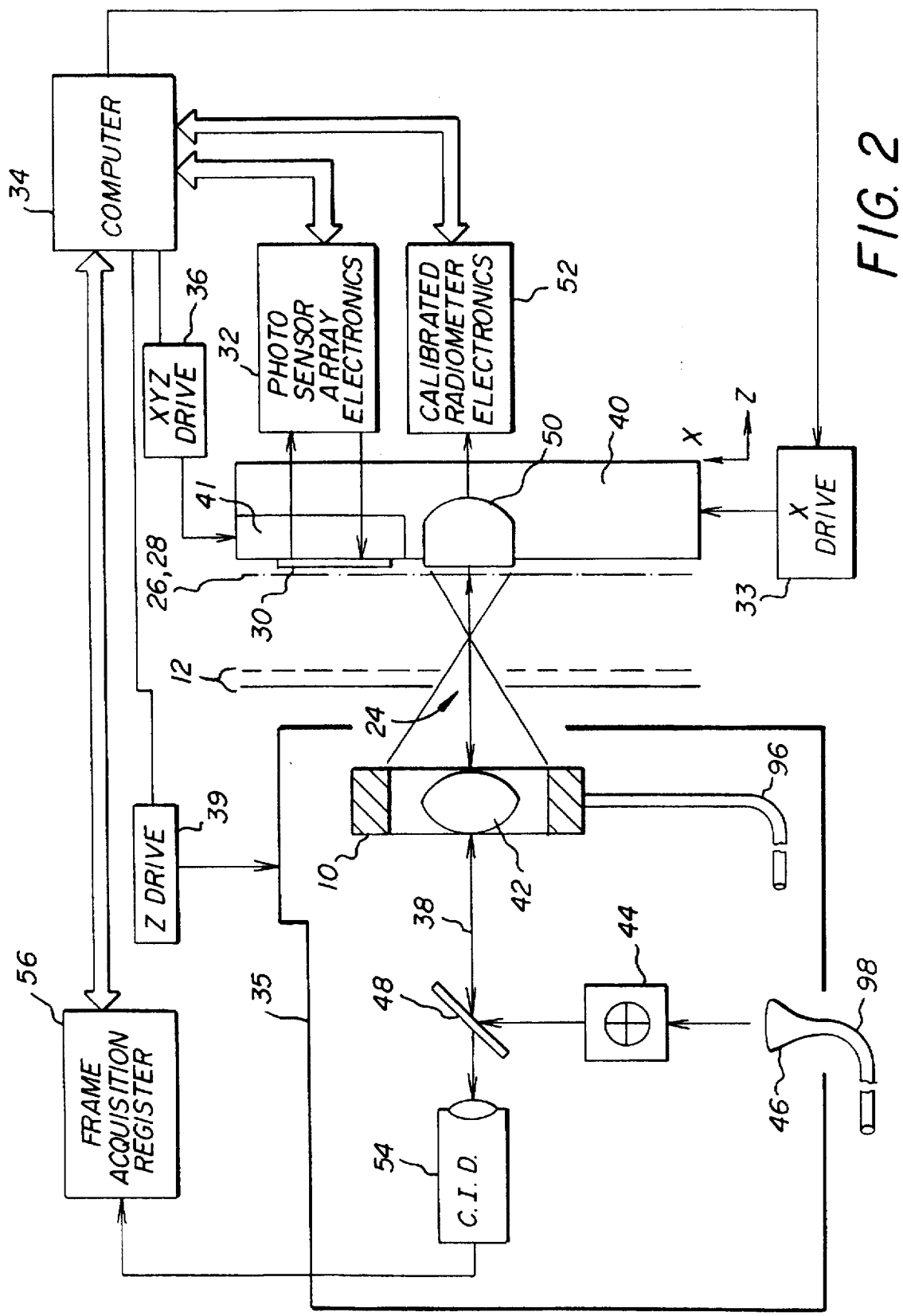
FIG. 2 is a top view of the components of FIG. 1 together with additional test set-up components.

Referring to FIG. 2, the photosensor array 30 is attached to an X, Y, and Z-direction adjustable support table 41 which may be moved in the three orthogonal directions by an X, Y, Z-direction drive system 36 in response to signals from a computer 34. The support table 41 is in turn attached to an adjustable support table 40 which moves in the X-direction only through drive system 33 and computer 34. The foregoing forms an electromechanical indexing system for controllably moving the SUT 30 along the indicated X, Y, Z axis. The photosensor array electronics 32 provides power and read out for each of the photosensors forming the photosensor array 30. The photosensor array 30 is placed into the path of the light passed by the adjustable aperture assembly 12. The electromechanical indexing system permits the light from the apertured opening 24 to fall on SUT 30 in a controlled sequential pattern. The area of the photosensor array that is illuminated by the apertured light beam, (beam passing through the adjustable aperture assembly 12), as stated is denoted 27. Additionally, each photosensitive element in the photosensor array 30 is referred to as an "S-site." Each portion of the apertured light beam, equivalent in size to a corresponding photosensitive element, is referred to as an "E-site." Files are established in the computer's memory for S-site data and E-site data. Each of the photosites (S-sites) that receive a quantity of illumination that in turn causes the photosensor to output a signal is considered to make up the rectangular illuminated area 27 which by definition corresponds to the projected effective aperture EA 26.

A calibrated, integrating sphere radiometer 50 is mounted to the support table 40 for selective movement in the X-direction. The radiometer 50 and the SUT 30 are preferably mounted to the same support table 40, such that either the SUT 30 or the radiometer 50 may be positioned in front of the illumination from the apertured opening 24. When the support table 40 is adjusted to the position depicted in FIG. 2, the total quantity of light in EA 26 is collected in radiometer 50, and the corresponding radiometric output signal is provided by a calibrated radiometer electronics 52 to the computer 34. In this position, the radiometer 50 measures the total light which would impinge onto the surface of the photosensor in the region defined as the illuminated area 27 if it were to be indexed to the same X-coordinate position. The radiometer 50 used was a model S 370 available from Grasby Electronics in Orlando, Fla.

In the method described in more detail below, two separate files of S-site signals may be accumulated in computer 34 when the EA area 27 of photosensor array 30 is aligned with the apertured opening 24. One file collects a specific sensor's response to all E-sites within a defined region by physically moving in X and Y to occupy each of those E-site locations. A total signal value related to the total amount of light falling on the S-sites can be derived through summation of the individual S-site signals. When the photosensor array 30 is removed from alignment with the EA 26 and replaced with the calibrated radiometer 50, the same emission can be collected by the radiometer 50, converted to a calibrated total emission signal, and stored in computer 34. This radiometric measurement provides a total calibrated equivalent to the previous relative summation. A second file collects a specific E-site value as measured by all of the sensors within a defined companion sensor region. When all E-site values have been collected and processed, calibrated E-site values result. The specific E-site measured by all sensors is among these calibrated values, and is used as a link to determine the calibrated sensitivity of each S-site.

Figure 3:
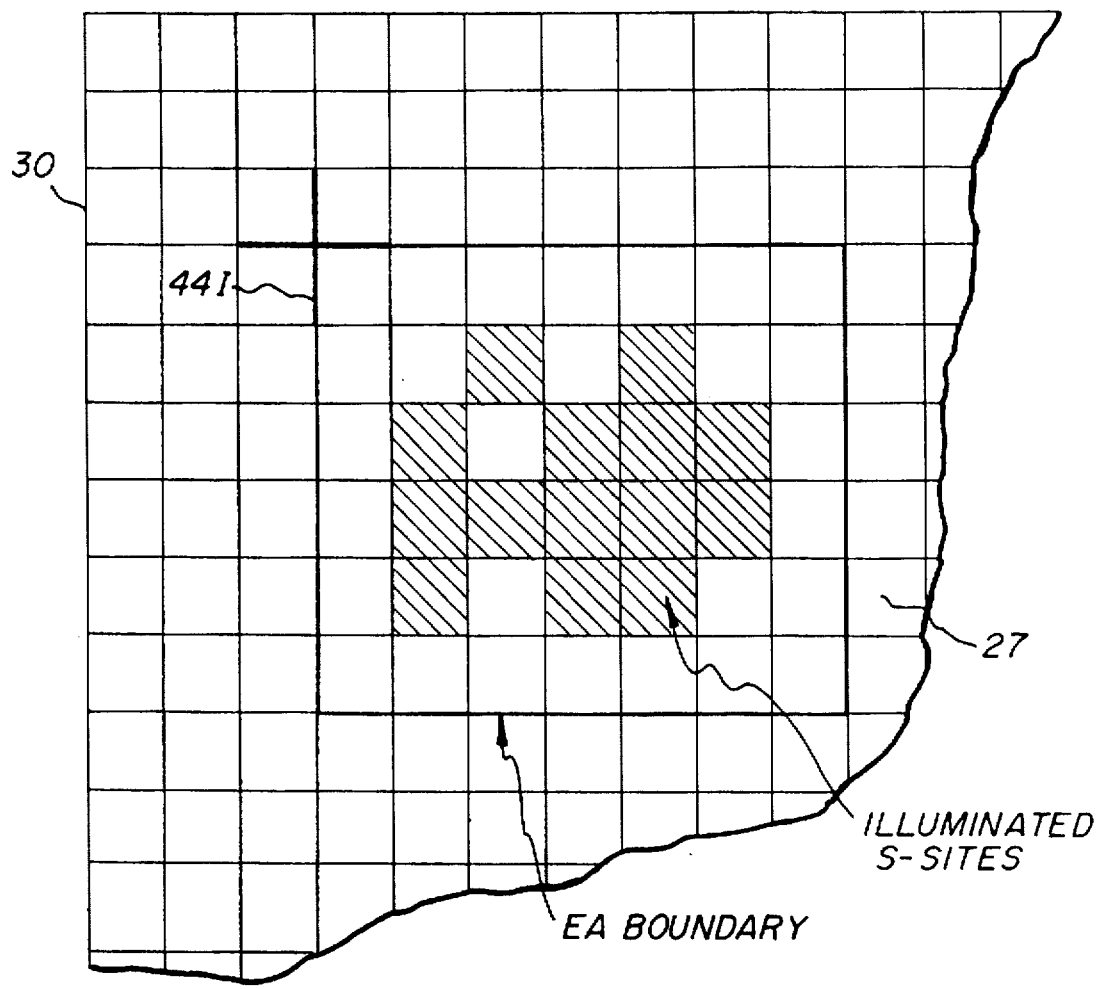
FIG. 3 is a schematic diagram illustrating the orientation of a projected cross hair image in relation to a defined region of sensor pixels in an imaging sensor.
Figure 4:
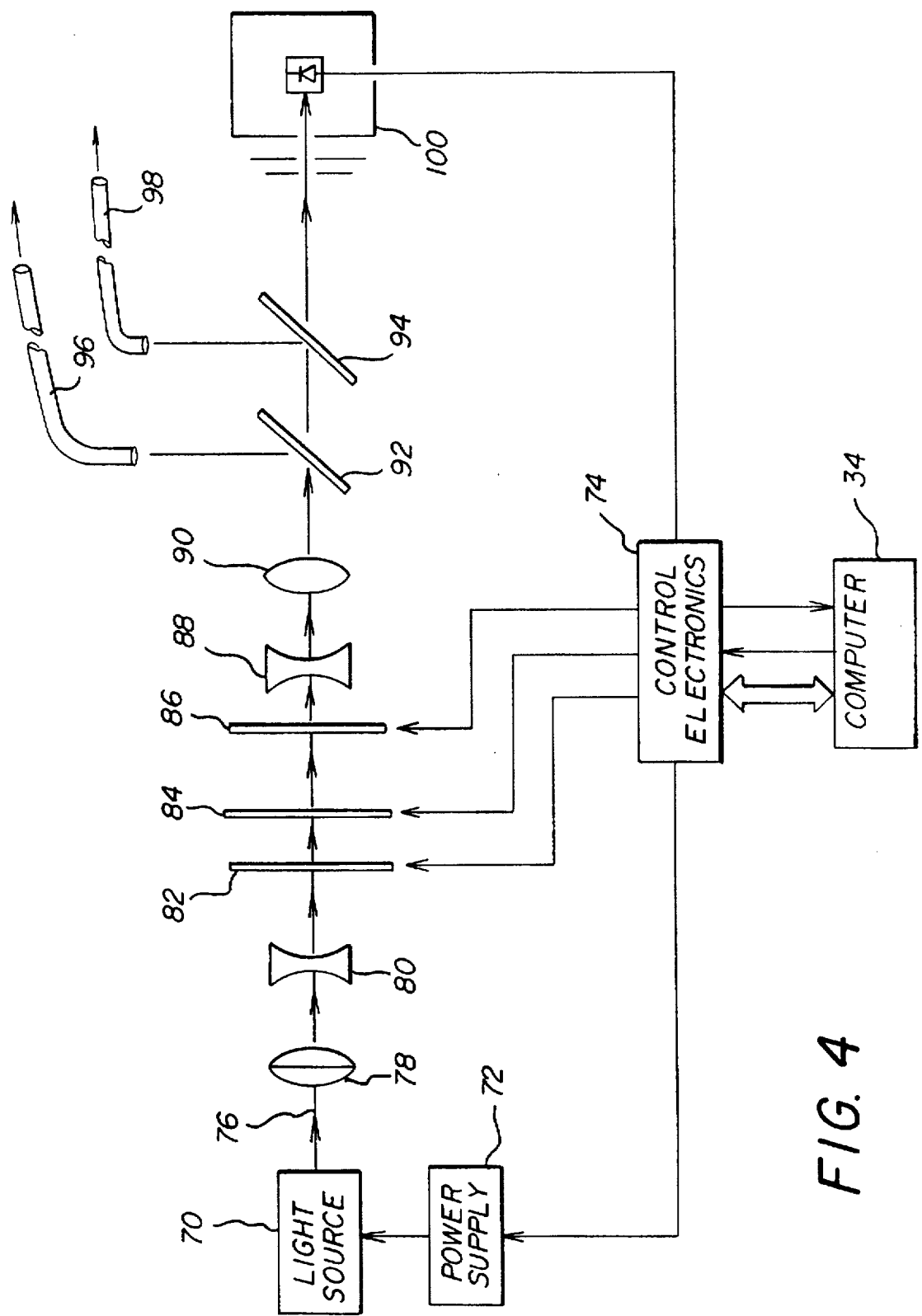
FIG. 4 is a side schematic diagram of a regulated light emission source for use in providing a regulated intensity light beam of a defined frequency to the emission source of FIGS. 1–2 and to a further inspection emission source.

FIG. 2 also depicts the ring illuminator 10 which is coupled by optical fibers 96 to the light source system of FIG. 4. A reflection microscope objective lens 42 is fitted within the annulus of the ring illuminator 10 so that an image of the S-sites in the EA area 27 illuminated by the ring illuminator 10, may be projected along path 38. The projected image is employed in the initial alignment sequence to set orientation, direction, focus, and magnification factors associated with positioning of each S-site within the EA area 27. Also illustrated is a beam splitter 48 that receives a projected cross hair pattern 441 (see FIG. 3) along with a CID array video camera 54 that outputs images to a frame acquisition register 56.

Referring now to FIG. 3, which illustrates an enlarged cut-away corner of a photosensor array 30, formed of a 2D matrix of photosensor sites S. The support table 40 is commanded to move incrementally in the appropriate X-direction and Y-direction until projected cross hair dark pattern (image 441) is aligned with the effective aperture borders (boundaries) of a desired row and column of the S-sites in the photosensor array 30. The projected cross hair pattern 441 is formed by a cross hair mask 44 that is illuminated via an inspection light source 46, that derives its light from a filter optic cable 98 (see FIG. 2). The borders also define the rectangular illuminated area 27. The shaded S sites are those that are registering at their outputs that they are receiving illumination. Other sites may be receiving illumination, but not enough to register an output. The image frames generated by the CID array video camera 54 are accumulated in a frame acquisition register 56. In order to return to a selected row and column position in the photosensor array 30, the support table 40 adjustment settings for that position are saved in computer 34 in reference to an acquired image frame of the position.

Referring to FIG. 4, the light emission from ring illuminator 10 and the inspection light source 46 is effected by the exemplary light source control system. The system includes a light source 70 which is driven by a power supply 72 turned on by a command from control electronics 74 in response to a command from the computer 34. A light beam 76 is emitted and focused by lenses 78 and 80 through a neutral density filter wheel 82, a color filter wheel 84 and a PLZT shutter 86. The filtered light beam 76 is projected by lenses 88 and 90 and split by beam splitters 92 and 94 into three partial intensity light beams. The first split beam is reflected into the light conducting optical fiber 96 that is coupled to the ring illuminator 10. The second split beam is reflected into the light conducting fiber optic cable 98 that is coupled to the inspection light source 46. The remaining split beam is directed into a light trap and photodiode 100. The instantaneous intensity of the light source 70 is converted by the light trap and photodiode 100 into an intensity feedback signal that is fed back to the control electronics 74 to effect a corrective change in the supply voltage provided by the power supply 72 to provide a corresponding correction in the light beam intensity if the intensity changes from a predetermined set level.

Figure 5:
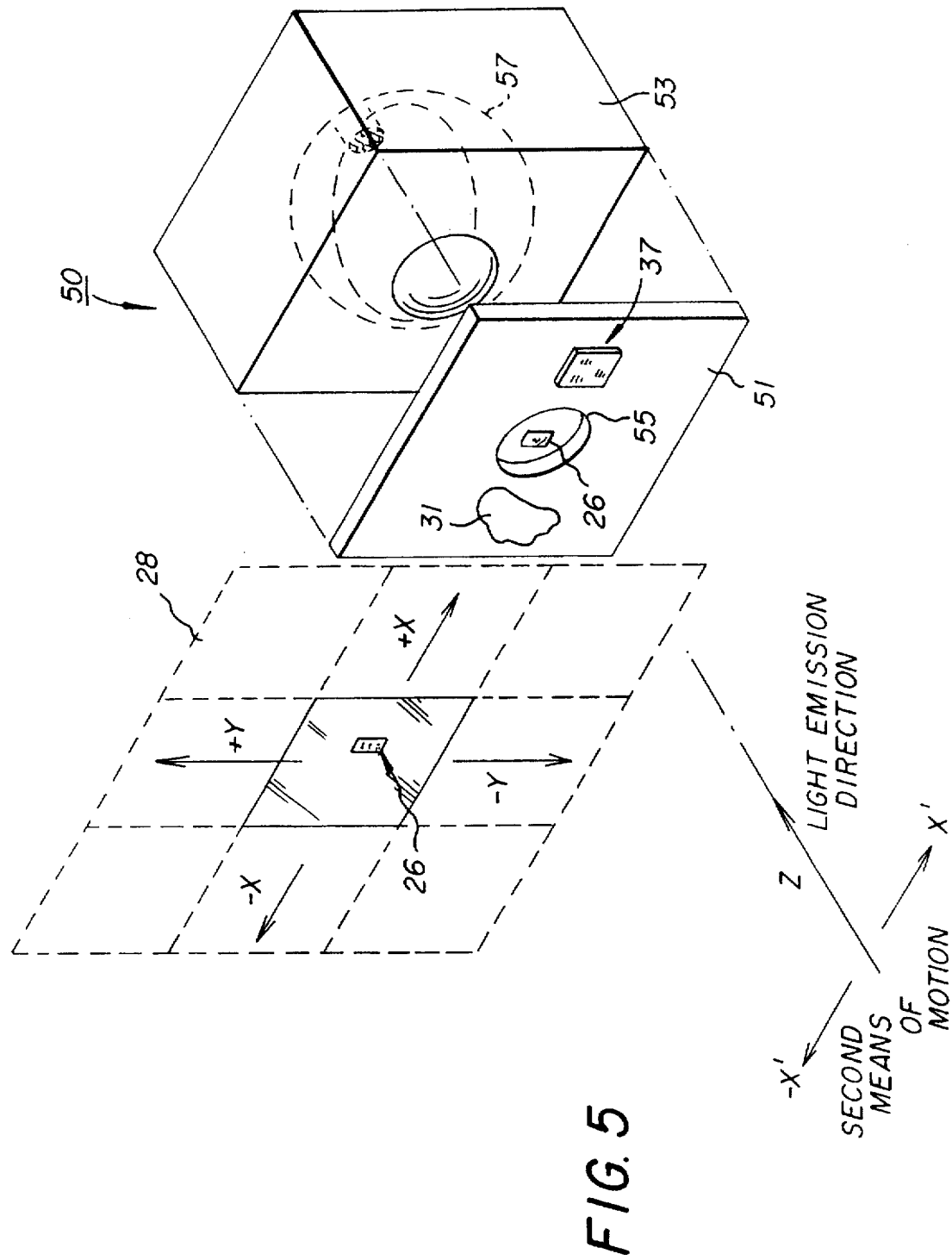
FIG. 5 is a perspective schematic diagram illustrating the radiometer apparatus and the reflectance/alignment targets in relation to the sensor plane and its relative motions.

Referring now to FIG. 5, a radiometer cover plate 51 is also depicted in relation to the radiometer housing 53 that bears a standardized reflectance region 31, an opening 55 into the integrating cavity 57 of radiometer 50, and a set of target fiducial markings 37 adjacent to the opening 55. The EA 26 is shown schematically projected in the opening 55, as well as onto projected sensor plane 28 when indexed appropriately in the X-direction. The reflectance region 31 is used as a reflective reference for initialization and long term calibration of the brightness of the emission source. The target fiducial markings 37 are used to position the projected sensor plane 28 with respect to the EA 26 and to determine the position of same in the Z-direction along the optical axis.

Figure 6:
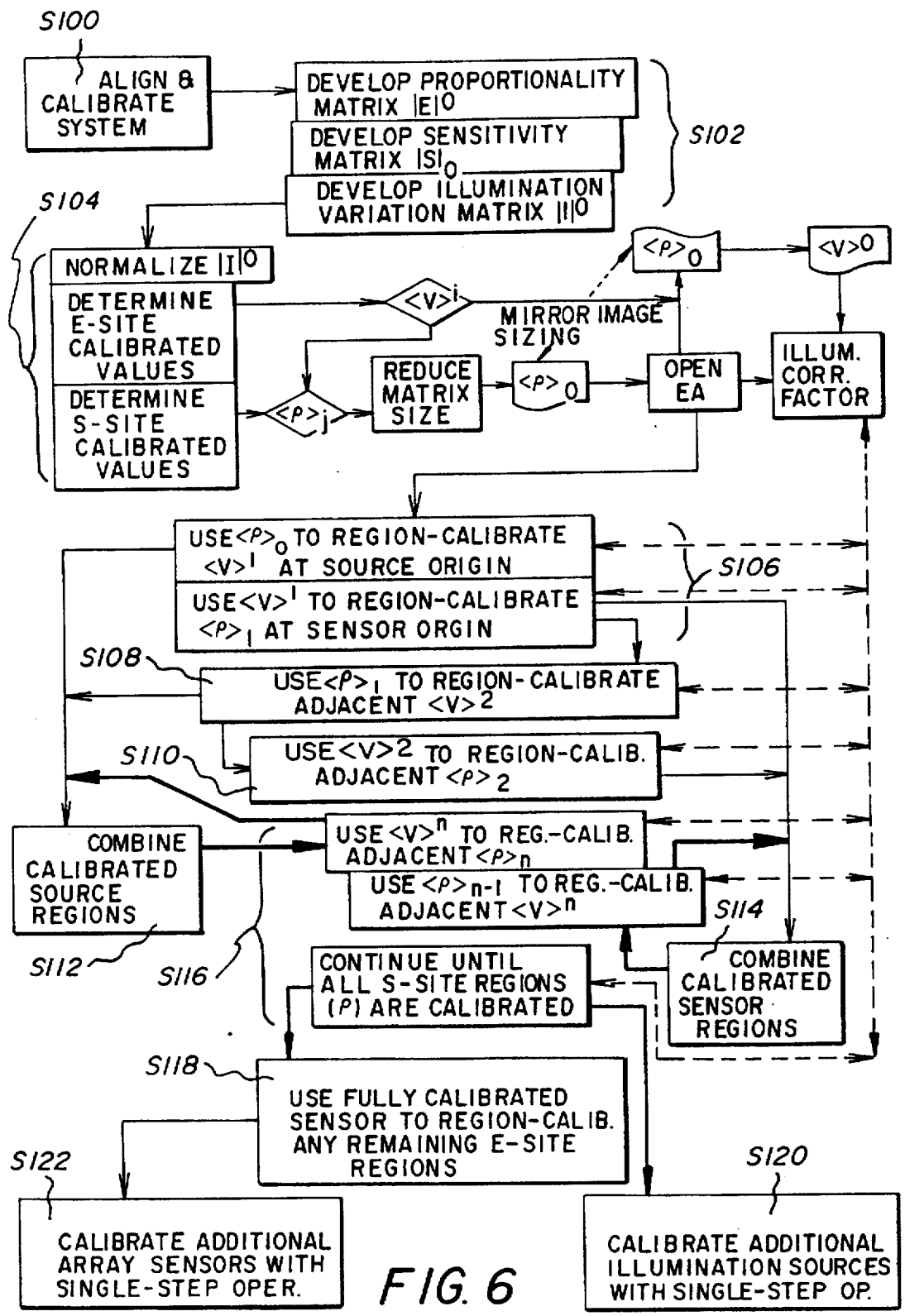
FIG. 6 is a process flow chart showing an overview of the steps and their relationship to each other in the calibration of source and sensor.

Referring now to the FIG. 6, a process is described in Steps S100 through S122 wherein the apparatus in FIGS. 1–5 is used to align and calibrate an area array sensor, such as a CCD or CID type, and at the same time, calibrate the light source illuminating the array sensor. Both the source and the sensor are calibrated on a pixel-by-pixel basis as a result of this process. The sensor, when calibrated, is known as a Calibrated Sensor Surface (CSS), and the light source, when calibrated, is known as a Calibrated Emission Surface (CES). Each of the steps shown in FIG. 6 will be shown in more detail, with additional terms and relationships defined in Appendices A and B.

The process has several basic steps, some of which require data to be first accumulated and stored. Following alignment of the sensor with the motion axes of the system, a small region of the source, referred to as an Effective Aperture, is defined and calibrated. This calibrated region is then used to calibrate a sensor region, which in turn is used to calibrate another source region. Each newly calibrated region of either source or sensor is grouped with all previous calibrated regions of same to form even larger contiguous calibrated regions. Calibrated growth is geometric, with each new region being twice-sized the previous calibrated region.

Step S100 of FIG. 6 is an alignment and initialization process to determine focal planes, SUT orientation, pixel pitch, illumination levels, specific regions of interest, and specific pixels within those regions.

Step S100 Alignment and Calibration of System
Provide a well-defined illumination at the sensor plane
 a) Set wavelength, color temperature, or other bandpass metric
 b) Define aperture boundaries to illuminate a small region of the array sensor. Illuminated area must be smaller than field of view of video inspection system and associated frame capture.
 c) Align calibrated radiometric apparatus to collect and measure this apertured region of illumination.
Pick a region of the sensor array to be a calibrated reference region
 d) Illuminate with the defined, projected aperture
  must be bounded on all sides by rows and columns of non-illuminated sensor pixels
  must be free of row, column, or site defects. All sensor sites within this region must be active.

Orient and position sensor array e) Align plane of sensor face to X-Y sensor motion f) Align coordinates of sensor array to coordinates of video inspection system g) Align X and Y axes of sensor to be parallel to sensor motion directions With aperture 24 fully opened, set projected sensor plane 28 of photo sensor array 30 by first setting optical focus of lens 42 to target fiducial markings 37. Focus is set by means of a Z-direction support table 35 in response to signals generated by the Z-direction drive system 39 and computer 34. Next, index SUT 30 in X-direction to be positioned in front of apertured opening 24, and set Z-direction to conform to this same projected sensor plane 28 as specified by target fiducial markings 37 and focused lens 42. Next, adjust axial and translational X and Y motions of SUT 30 to align to coordinate motion axes X and Y of the support table 41 and coordinate motion axis X of support table 40.

Determine coordinate boundaries of sensor array h) Determine X and Y video magnification factors i) Establish a calibrated relationship between video spatial coordinates and the X-Y sensor coordinates Turn on inspection light source 46 to illuminate cross hair mask 44 and project its image via beam splitter 48 and lens 42 to SUT projected sensor plane 28, which has been moved into position by support table 40 to be in front of apertured opening 24. Image 44I in FIG. 3, as reflected from SUT projected sensor plane 28 along path 38 to CID array video camera 54, is used to determine the beginning and ending boundaries of the EA area 27, along with the establishment of a global origin and boundary limits for the sensor elements in SUT 30. Frames of acquired images from CID array video camera 54 and frame acquisition register 56 are processed by computer 34 to determine specific row and column coordinates of projected cross hair pattern image 44I. These row and column coordinates determine the global origin, the pitch of the sensor elements, and the boundaries of the SUT element sites.

Determine "no light" illumination measurement values j) Record and store video inspection system frame of sensor reference region k) Record and store frame of array sensor response within same reference region l) Record radiometer measure of defined aperture Set illumination level and define Effective Aperture m) Adjust illumination level such that no sensor pixels are at or near saturation n) Acquire sensor frame and site-subtract the previous "no-light" value from each sensor pixel site o) Define row and column illumination boundaries. The illuminated region within this bound is the Effective Aperture (EA) of the illumination system The location and size of the EA is established by first restricting the apertured opening 24 to a minimum size such that 200–300 S-sites are illuminated. The SUT is positioned by support table 40 relative to apertured opening 24 such that the illuminated EA region 27 is not adjacent to any of the external borders of the sensor. This positioning insures that all light originating at apertured opening 24 will be received and measured by the EA region of SUT 30. Video thresholding techniques are used to define the regional size and location of the S-sites which make up the Ea. Illumination above a predetermined background threshold qualifies each and all S-sites to be initially selected as part of the EA region. Following the sizing of the EA, the apertured opening 24 is fixed, and the illumination provided by ring illuminator 10 is monitored for changes and corrections by photodiode 100 and control electronics 74 in FIG. 4. Final sizing of the EA is done at this point in the process. The EA is extended by one row and one column prior to and following the border pixel sites of the previous threshold-established region. This step is done to insure that all light emitted from apertured opening 24 is collected by SUT 30.

Select a designated Emission site ($E^E$) and a designated Sensor site ($S_S$)

p) The ($E^E$) site can be any non-zero value within the EA. This will be used to build a calibrated sensitivity map of the sensor pixels within the Effective Aperture q) The ($S_S$) site, also a non-zero value as determined by the sensor, can be any sensor location within the EA other than the S-site corresponding to an overlay of the $E^E$ site. It will be used to build a calibrated proportionality may of each E-site within the Effective Aperture Step S 102 of FIG. 6 is a series of data acquisition steps, each of which is preceded by a SUT motion of one pixel element of sensor relative to the projected EA 26 impinging on SUT projected sensor plane 28.

Referring to the E-sites as stationary sites, and to the S-sites as moving sites, a single S-site (designated $S_S$) will sequentially overlay each E-site within the EA and measure its radiant value. Each measurement is done by acquiring a frame of video information using photosensor array electronics 32, computer 34, and frame acquisition register 56. The single overlay value $S_S$ is extracted from this file, and placed in a second file corresponding to the position of the measurement location within the EA in the first file. This second file is sequentially built, each file value preceded by a SUT pixel indexing and EA frame acquisition. It is called a proportionality map, and represents a proportional response of a single sensor element to any and all E-site locations within the EA area 27. Each iteration of $S_S$ over sequential E-sites within the EA results in one additional value in a location-specific proportionality map of the E-sites.

Similarly, a single E-site (designated $E^E$) will be sequentially overlaid and measured by any and all S-sites within the projected EA 26. Each measurement is done by acquiring a frame of video information using photosensor array electronics 32, computer 34, and frame acquisition register 56. Each sensor's sequential response to the designated $E^E$-site is extracted from its respective video frame, and placed in its position of measurement location within the EA in the third file. This third file is sequentially built, each file value preceded by a SUT pixel indexing and EA frame acquisition. It is called a sensitivity map, and represents each sensor's response to a single E-site value.

Prior to calculation of the sensitivity map, the $E^E$-site calibrated value must be determined. This is done by means of an additional sequence of radiometric measurements, each of which indexes radiometer 50 on support table 40 in the X-direction such that the radiometer occupies the same position as projected EA 26 from apertured opening 24. Each sequential measurement captures all of the radiation in EA 26, and becomes a time-dependent file value in a calibrated illumination map.

Figure 7:
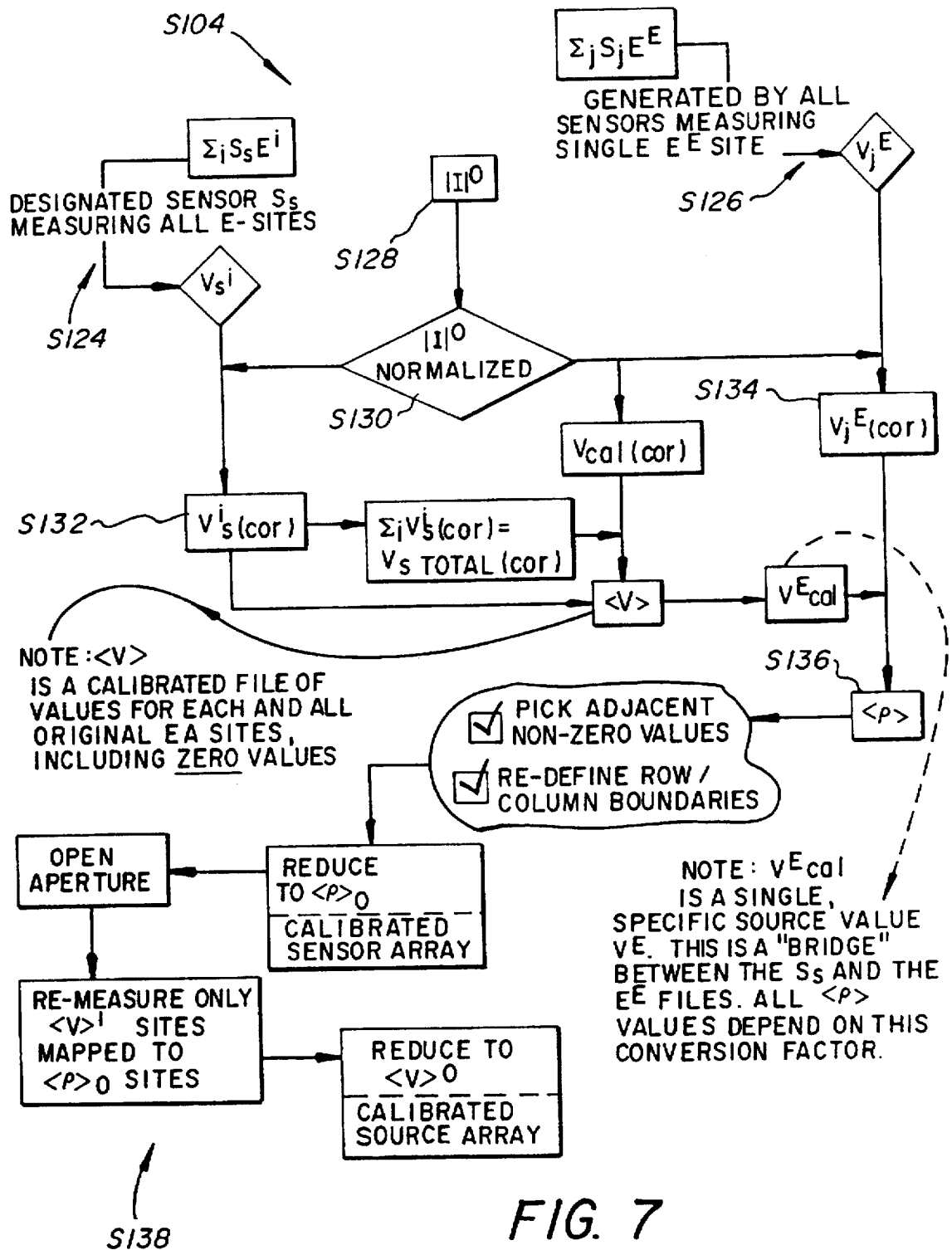
FIG. 7 is a process flow chart detailing two of the data collection and computation steps shown in FIG. 6.

At this point in the description of the invention, reference will be had to both FIGS. 6 and 7 wherein the flowchart of FIG. 7 provides additional detail in Steps S124 through S138 regarding the data accumulation and calculation as referenced in Steps S102 and S104 of FIG. 6.

Step 102

Develop Proportionality Map $V_S^i$

Develop Sensitivity Map $V_j^E$
Develop Illumination Variation Map $II^o$
Position sensor element $S_S$ at Effective Aperture origin
a) Acquire and store Effective Aperture frame from sensor
b) Extract the first file value $S_S E^1$ and store in $V_S^i$ file; discard Effective Aperture stored frame. $V_S^i$ is the Emission site proportionality map.

Values of $V_S^i$ are acquired sequentially. Each set of sequence steps is as follows:

A) SUT—site $S_S$ is indexed to a position within the EA corresponding to E-site $E^i$.
B) A single frame of all sensor values within the EA is acquired, including the specific sensor element $S_S$ at E-site location $E_i$.
C) The value $V_S^i = S_S E^i$ is extracted from this group of E-site measurements and stored in the proportionality map file.
D) SUT is indexed to the next adjacent E-site location within the EA.

Repeat $S_S$ for all (i) sites of $E_i$, corresponding to Step S124 in FIG. 7.

Re-position array sensor such that $S_1$ overlays $E^E$ Emission site element c) Acquire and store Effective Aperture frame from sensor
d) Extract the first file value $S_1 E^E$ and store in $V_j^E$ file; discard Effective Aperture recorded frame. $V_j^E$ is the basis of the sensor sensitivity map.

Values of $V_j^E$ are acquired sequentially. Each set of sequence steps is as follows:

A) SUT—site $S_j$ is indexed to a position within the EA corresponding to E-site $E^E$.
B) A single frame of all sensor values within the EA is acquired, including the specific sensor element $S_j$ at E-site location $E^E$.
C) The value $V_j^E = S_j E^E$ is extracted from this group of E-site measurements and stored in the sensitivity map file.
D) SUT is indexed such that next sensor element within the EA is positioned at $E^E$. Repeat $E^E$ for all (j) sites of $S_j$ corresponding to Step S126 in FIG. 7.

Reposition the integrating sphere to collect all the illumination from the Effective Aperture plane e) Acquire an integrated, calibrated value I at time t=k
f) Store as a matrix element in file $I_k$ Repeat $I_k$ for all separate or combined acquisitions of $S_j$ or $E^i$, corresponding to Step S128 in FIG. 7

Step S104 of FIG. 6 uses the radiometrically determined light output from EA 26 to assign a calibrated value to the individual sums as recorded by the $S_S^i$ values in making the proportionality map. The following steps determine the calibrated light output of each E-site within the EA 27. One of these calibrated values within the EA is $E^E$. Using the calibrated value of $E^E$, the sensitivity of all sensor elements within the EA can now be determined, because $E^E$ was the E-site measured by all S-sites.

Having determined the calibrated values for this first regional area, the region is conveniently re-sized to exclude zero values, and to make it of such rectangular shape as to easily calibrate new regions of opposite sense (sensor calibrates new source region, or source calibrates new sensor region). The reduced size sensor is now used to acquire a frame from the newly enlarged EA of the source. Since calibrated sensitivities of all reduced row/column sensor elements are now known, this measure becomes a calibrated measure of all corresponding location E-sites. These source sites are designated $<V>^o$.

Referring to FIG. 7, Step S104 of FIG. 6 is implemented with the following:

Step S104 Determine Calibrated Values of E-Sites and S-Sites

Normalize $|I^o|$ to first entered value, as shown in Step S130 in FIG. 7. Each value within this file is a radiometric measure of the total light within the EA at different sampling times k corresponding to $S_S E^i$ or $S_j E^E$ frame acquisitions.

Modify $V_S^i$ on per-site basis to correct for changing brightness, using the above normalized (I) file values as multiplication factors for each frame acquisition. Refer to Step S132 in FIG. 7.

Calculate $V_{cal}^i = V_S^i \times V_{cal}/V_{S\ Total}$

See (Eq.8) in Appendix B for a derivation of this relationship.

Each value $V_{cal}^i$ is computed from the following inputs:
a) $V_S^i$—the $i^{th}$ E-site value as read by a specific sensor element $S_S$.
  This same sensor element goes on to measure each and every E-site within the EA, generating the array of values that become the proportionality map.
b) $V_{S\ Total}$—the $\Sigma_i V_S^i$ of all values of (i) as measured by a specific sensor site $S_S$.
c) $V_{cal}$—a calibrated radiometric value of the total emission at the EA plane. Measured with a radiometer coupled to an integrating sphere.

Each of the (i) file values $V_{cal}^i$ is measured by a single sensor element $S_S$.

Each value within the array corresponds to a calibrated measurement of the light being received at the EA plane from the mirror-image E-site location. The regional set of calibrated E-site values linked to locations is known as $<V>$. For this and other regional notation, refer to definitions in Appendix A.

Modify $V_j^E$ on per-site basis to correct for changing brightness, using the above normalized (I) file values as multiplication factors for each frame acquisition. Refer to Step S134 in FIG. 7.

Calculate Sensitivity factor $(\rho)_j$ of the $(j^{th})$ S-site using $S_j E^E$: refer to Step S136 in FIG. 7

$\rho_j = V_j^E / V_{(cal)}^E$ where
$V_j^E$ is the $(j^{th})$ S-site value from the modified sensor sensitivity map above,
and
$V_{(cal)}^E$ is calibrated E-site value at position (i=E) (computed above).

Figure 8A:
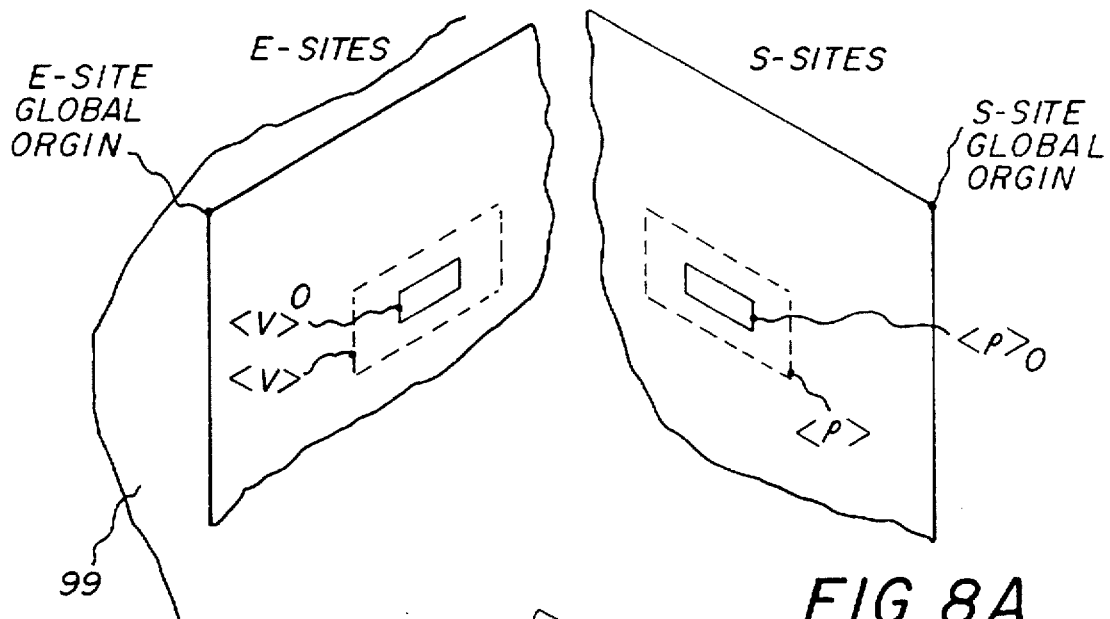
FIGS. 8A, 8B, 8C, and 8D are pictorial representations of calibrated regions of either source or sensor being used to calibrate opposite regions.

Reduce $(\rho)_j$ to a one dimensional non-zero matrix;
Re-define row/column boundaries
Designate resulting reduced S-matrix as $<\rho>_0$, also known as the Calibrated Sensor file as further shown in FIG. 8A.

Open aperture to fullest extent. Note that with aperture 24 fully opened, illumination region 99 (see FIG. 8A) in the sensor plane 28 extends beyond the global boundaries as defined by the size of the SUT 30. Calibration of the light source in regions outside the global boundaries of the SUT are calibrated as a last step in the process.

Re-read E-sites with Emission values $V_{(cal)}^i$ corresponding to reduced row set $<\rho>_0$ as in Step S138 in FIG. 7.

Designate resulting reduced source file as $<V>^o$, also known as the Calibrated Source file For convenience of explanation in further steps, $<\rho>_0$ and $<V>_0$ are shown as (1×n) matrix arrays. They could just as easily be (m×n) in size, with both $<\rho>$ and $<V>$ being exactly the same in size.

Figure 8B:
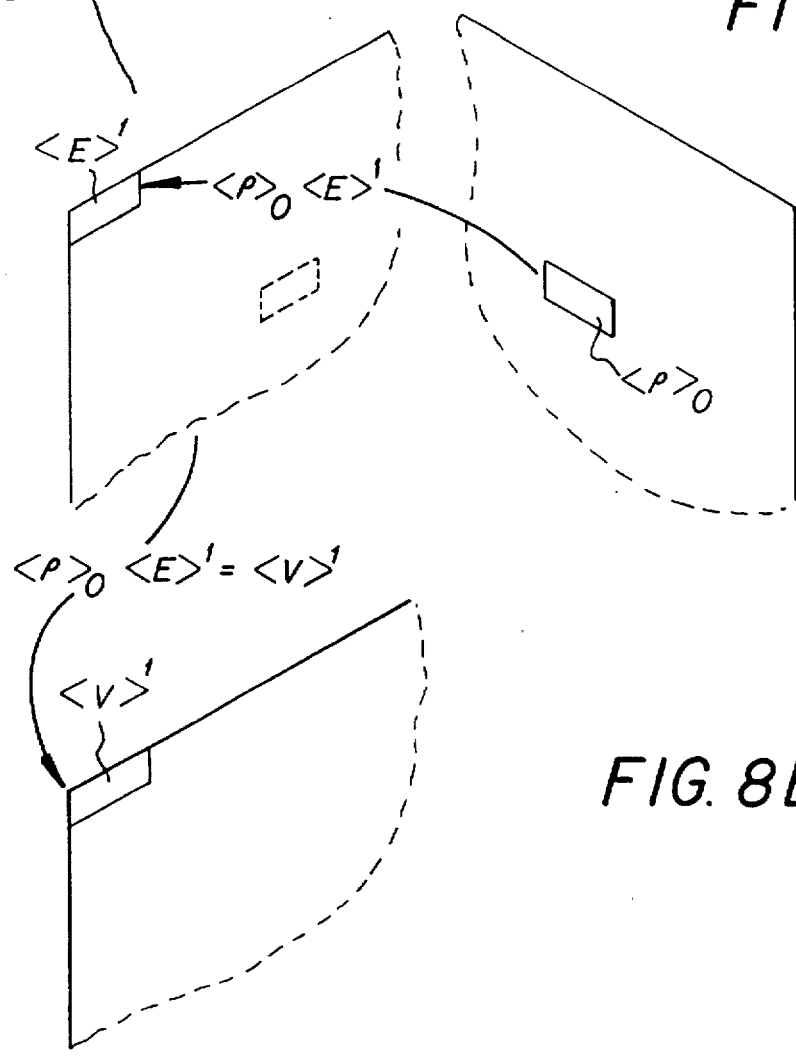
Figure 8D:
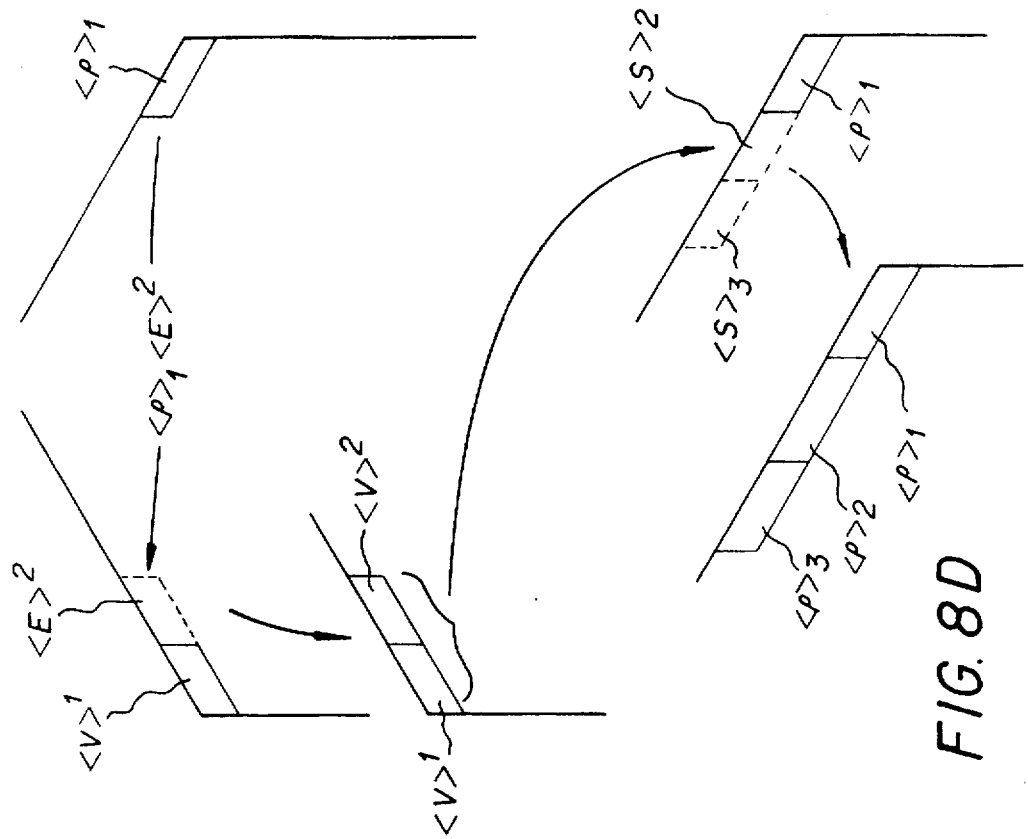
Figure 8C:
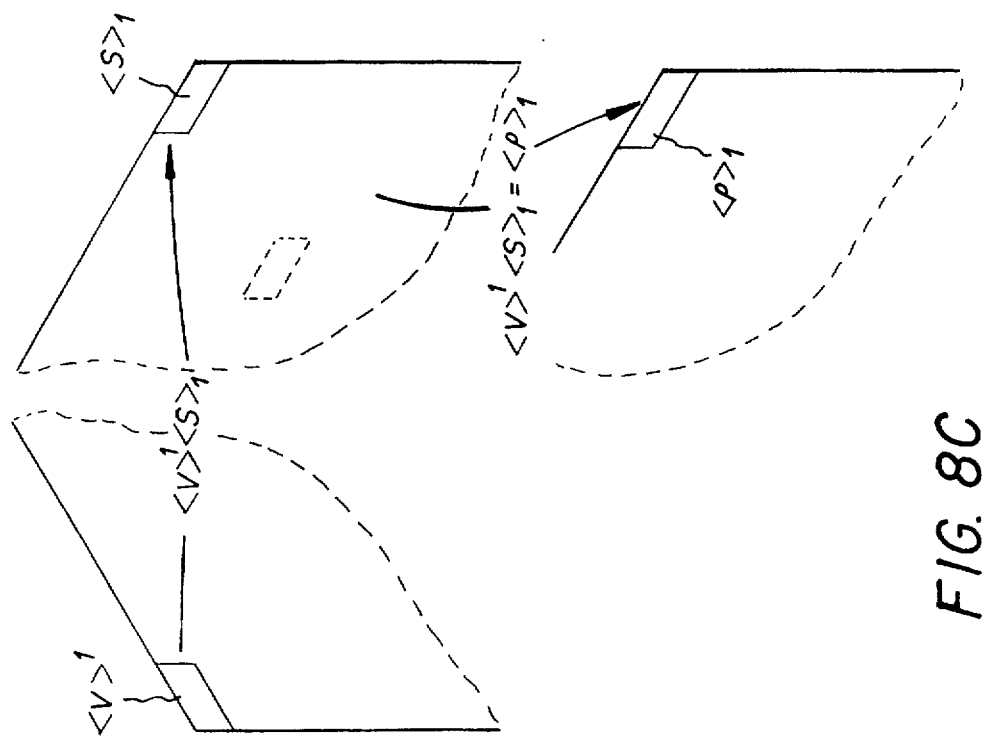

Referring to Step S106 in FIG. 6, the calibrated sensor region $<\rho>_0$, which by design is not near any of the boundaries of the sensor, is now used to begin the transference of the calibration process. Region $<\rho>_0$ of the SUT 30 is indexed in the X and Y-directions, as shown in FIG. 8B, such that it overlays the global origin of the source. Following a calibration of this E-site global origin region, the newly calibrated region of the source is then used to region-calibrate (or transfer calibration to) the global origin region of the sensor as shown in FIG. 8C and detailed in Step S106 following.

Step S106

Use S-site calibrated region $<\rho>_0$ to region-calibrate first E-site region a) Move $<\rho>_0$ to overlay global origin of the E-sites
b) Record sensor values $<\rho>_0<E>^1=<V>_0^1$.

Use E-site calibrated region $<V>_0^1$ to region-calibrate new (and first) S-site sensitivities.

c) Move sensor to lay its global origin region over calibrated Emission region $<V>_0^1$
d) Record sensor values $<\rho>_1^1=<S>_1<V>_0^1$ Referring to Step S108 in FIG. 6, the global origin region of the sensor, which has just been calibrated, is now used to calibrate the next region of the source, which is adjacent to the global origin calibrated region $<V>_0^1$. Refer to FIG. 8D for a pictorial representation of this step.

Step 108

Use S-site global origin region $<\rho>_1^1$ to calibrate $<E>$ site region adjacent to global origin calibrated region $<V>_0^1$.

a) Move sensor to lay calibrated sensitivities $<p>_1^1$ over uncalibrated Emission region $<E>^2$
b) Acquire frame $<V>_1^2=<\rho>_1^1<E>^2$ Referring to Step S110 in FIG. 6, the second source calibrated region $<V>_1^2$ is used to region-calibrate the next sensor region, adjacent to the global origin calibrated sensor region. Refer again to FIG. 8D for a pictorial representation of this step.

Step S110

Use E-site calibrated region $<V>_1^2$ to region-calibrate a sequential S-site region adjacent to global origin calibrated region $<\rho>_1^1$.

a) Move sensor to lay region $<E>^2$ with calibrated Emission values $<V>_1^2$ opposite and aligned to uncalibrated Sensor region $<S>_2$
b) Acquire frame $<\rho>_2^2=<S>_2<V>_1^2$ Referring to Step S112 and S114 in FIG. 6, adjacent sensor and source regions which are calibrated are now combined into respective single files, and these larger regions are used for the next calibration step.

Step S112

Combine all resultant, calibrated S-site regions and use this combined, calibrated region to region-calibrate the next E-site region.

a) Define new Sensor-region $<S>_{2'}$ as the combination of ordered sets $<S>_1$ and $<S>_2$. Computed sensitivity values in associated sets $<\rho>_2^2$ are ordered in the same manner and re-defined as an aggregate $<\rho>_{2'}^2$.
b) Move sensor to lay combined region $<S>_{2'}$ with calibrated sensitivities $<\rho>_{2'}^2$ over uncalibrated adjacent Emission region $<E>^3$. Note that $<E>^3$ is sized twice as large as either $<E>^1$ or $<E>^2$.
c) Acquire frame $<V>_{2'}^3=<\rho>_{2'}^2<E>^3$ Step 114

Combine all resultant calibrated E-site regions and use this combined, calibrated region to region-calibrate next adjacent S-site region.

a) Define new Emission region $<E>^{3'}$ as the combination of ordered sets $<E>^1$, $<E>^2$ and $<E>^3$. Computed values in associated sets $<V>_0^1$ and $<V>_1^2$ and $<V>_2^3$ are ordered in the same manner and re-defined as an aggregate $<V>_{2'}^{3'}$.
b) Move sensor to lay region $<E>^{3'}$ with calibrated Emission values $<V>_{2'}^{3'}$ opposite next adjacent uncalibrated Sensor region $<S>_3$. Note that $<S>_3$ is sized ($2^3=8$ times) larger than $<S>^1$.
c) Acquire frame $<\rho>_3^{3'}=<S>_3<V>_{2'}^{3'}$
d) Define new Sensor-region $<S>_{3'}$ as the combination of ordered sets $<S>_1$, $<S>_2$, and $<S>_3$. Computed values in associated sets $<\rho>_1^1$, $<\rho 22>_2^2$ and $<\rho>_3^{3'}$ are ordered in the same manner and re-defined as an aggregate $<\rho>_{3'}^{3'}$.
e) Move sensor to lay combined region $<S>_{3'}$ with calibrated sensitivities $<\rho>_{3'}^{3'}$ over uncalibrated adjacent Emission region $<E>^4$. Note that $<E>^4$ is sized twice as large as $<E>^{3'}$, or ($2^4$) 16 times larger than $<E>^1$.

Step S116

Continue geometric growth calibration process until all sensor site regions are calibrated.

a) Repeat Steps S112 and S114 until the first row of Emission sites and paired sensor sites have been calibrated.
b) Use Row 1 of calibrated S-sites to region-calibrate Row 2 of Emission sites.

$$<V>^{Row\ 2}=<\rho>_{Row\ 1}<E>^{Row\ 2}$$

and c) Similarly, use the aggregate calibrated Emission regions $<V>^{Row\ 1}$ and $<V>^{Row\ 2}$ to region-calibrate Rows 2 and 3 of Sensor sites; designate as $<V>^{Row\ 2'}$ $$<\rho>_{Row2,3}=<S>_{Row2,3}<V>^{Row2'}$$

d) Continue Steps S116 b) and S116 c) until all rows of the sensor are region-calibrated. The Emission site calibration will be completed one iteration prior to the completion of the sensor calibration.

Step S118

Use calibrated sensor to complete any regional-calibration of the Emission sites which are as yet uncalibrated due to source size being larger than sensor size.

a) Move any calibrated portion of the sensor to overlay the remaining uncalibrated area(s) of the Emission source. Since the sensor readings are all calibrated, any reading of an uncalibrated E-site is a direct calibrated measure of its output.

Steps S120 and S122

With a calibrated sensor or corrected source, a new opposite (calibrated source or sensor) can be produced with a single exposure of calibrated source to new sensor or new source to calibrated sensor.

The invention has been described with reference to a preferred embodiment. However, it will be appreciated that variations and modifications can be effected by a person of ordinary skill in the art without departing from the scope of the invention.

PARTS LIST 10 ring illuminator
12 adjustable aperture assembly 16, 17 first planar light plate pair
18 horizontal aperture
20, 21 second planar light plate pair
22 vertical aperture
24 apertured opening
26 effective aperture
27 rectangular illuminated area
28 projected sensor plane
30 photosensor array
31 reflectance region
32 photosensor array electronics
33 X-direction drive system
34 computer
35 support table
36 X, Y, Z-direction drive system
37 target fiducial markings
38 path
39 Z-direction drive system
40 adjustable support table
41 Adjustable support table
42 reflection microscope objective lens
44 cross hair mask
44I projected cross hair pattern
46 inspection light source
48 beam splitter
50 calibrated, integrating sphere radiometer
51 radiometer cover plate
52 calibrated radiometer electronics
53 radiometer housing
54 CID array video camera
55 opening
56 frame acquisition register
57 cavity
70 light source
72 power supply
74 control electronics
76 light beam
78 lens
80 lens
82 neutral density filter wheel
84 color filter wheel
86 PLZT shutter
88 lens
92, 94 beam splitter
96 optical fiber (s)
98 fiber optic cable
99 illumination region
100 photodiode

APPENDIX A

Notation Conventions

Definitions and Terms

Effective Aperture (EA)—a region of illumination as defined by some elements of an area array sensor.

i,j—index counters relating to a position or location; i references Emission sites (E-sites); j references Sensor sites (S-sites).

$E^i$—refers to the $i^{th}$ E-site within the Effective Aperture of the system.

$S_j$—refers to the $j^{th}$ S-site within the Effective Aperture of the system.

$E^E$—a specific non-zero E-site within the Effective Aperture chosen to be measured by all sensor sites within the same Effective Aperture. $E^E$ becomes a basis for creating a sensor sensitivity map.

$S_S$—a specific non-zero S-site within the Effective Aperture chosen to measure all of the E-sites within the same Effective Aperture. $S_S$ becomes a basis for creating an E-site proportionality map.

$S_j E^i = V^i_j$—a relationship which denotes the $j^{th}$ S-site measuring the $i^{th}$ E-site within the Effective Aperture, resulting in a relative value $V^i_j$. Note: $S_j$ is considered to be a linear operator acting upon (measuring) the location whose label is $E^i$. The notation $S_j E^i$ does not imply that the quantity $S_j$ is multiplied by a quantity $E^i$.

$I^i$—a calibrated radiometric measurement of the total light emitted from all $E^i$ emission sites within Effective Aperture.

k—an index counter relating to a measurement at a specific time.

$(I^i)_k$—refers to the $k^{th}$ radiometric measurement of the total light $I^i$, taken at time t=k.

(cor)—denotes a measurement which has been corrected for time-induced brightness variations of the Emission source.

$V_{jTotal} = \Sigma_i V^i_S$—defined as the total light within the Effective Aperture window, as measured by a specific S-site $S_j$ iterating and summing over each E-site $E^i$.

$V_{STotal} = \Sigma_i V^i_S$—defined as the total light within the Effective Aperture window, as measured by a specific sensor element $S_S$.

$V_{(cal)}$—a measurement of the average value of light contained within the Effective Aperture of the system, over an interval t=k, as measured by a calibrated radiometer referenced to a standard metric.

$V^i_{(cal)}$—defined as the calibrated value of the $i^{th}$ E-site measurement as derived from appropriate subdivision of $V_{(cal)}$ by ratioing techniques.

$V^i_{(cal)} = (V^i_S \times V_{(cal)})/V_{STotal}$—see Appendix B for derivation $\rho_j = V^E_j / V^E_{(cal)}$—(ρ) is the sensitivity factor for each sensor element. ($\rho_j$) denotes the sensitivity of the jth sensor site, expressed in terms of a specific E-site $V^E$ by all sensors j within the Effective Aperture. See Appendix B for derivation of this relationship.

<>—Bracketed symbols refer to a regional set of locations in the case of uncalibrated E-Sites or S-Sites, and to a regional set of calibrated values linked to locations in the case of calibrated E-sites, known as <V>, or calibrated S-sites, known as <ρ>.

$<V>^i$—refers to a calibrated region of Emission site values. $<V>^0$ is the initial region value set, and becomes the reference for brightness variations of the source as a function of time.

$<\rho>_j$—refers to a calibrated region of Sensor site values. $<\rho>_0$ is the initial region value set, and becomes the mechanism to transfer calibrated values to the first region of E-sites at the E-site global origin.

$<V>^i_j = <\rho>_j <E>^i$—a relationship which denotes the $j^{th}$ S-site calibrated region measuring the $i^{th}$ E-site region, resulting in a calibrated value set $<V>^i_j$. Note:

$<\rho>_j$ is considered to be a linear operator acting upon (measuring) a region whose label is $<E>^i$. The notation $<\rho>_j <E>^i$ does not imply that the array quantity $<\rho>_j$ is multiplied by an array quantity $<E>^i$.

$<\rho>^i_j = <S>_j <V>^i$—a relationship where the $j^{th}$ S-site region measures the $i^{th}$ E-site calibrated region, resulting in a calibrated value set $<\rho>^i_j$. Note: $<S>_j$ is considered to be a linear operator acting upon (measuring) a region whose label is $<V>^i$. The notation $<S>_j <V>_i$ does not imply that the array quantity $<S>_j$ is multiplied by an array quantity $<V>^i$.

APPENDIX B

Using some of the above terms and definitions, the following derivation establishes a relationship between a relative ratio to the whole, as measured by a specific sensor within the EA, and the calibrated ratio as measured by a radiometer. It's purpose is to show that any sensor site $S_S$ can be selected to effect the process, and that the process of individual site calibration is not dependent upon the sensitivity of the specific site selected.

In this example we will consider the one-dimensional case for simplicity of notation. The two-dimensional case is true by extension.

Begin by measuring all (E) sites with the $j^{th}$ sensor $S^j$:

$$S_jE^1 = V_j^1$$
$$S_jE^2 = V_j^2$$
$$S_jE^3 = V_j^3$$
$$\vdots$$
$$S_jE^i = V_j^i$$

Sum all of the measured values $V_j^i$ over the effective aperture window i $$\Sigma_i V_j^i = V_j^1 + V_j^2 + V_j^3 + \ldots V_j^i = V_{jTotal} \quad (1)$$

Define the ratio of measurement value $V_j^i$ to the total light within the effective aperture $V_{jTotal}$ as:

$$R_j^i = V_j^i / V_{jTotal} \quad (2)$$

Define a pixel sensitivity factor rho ($\rho$) for the $j^{th}$ sensor (S) site as:

$$\rho_j = \Sigma_i V_j^i / V_{cal} \quad (3)$$

where $V_{Cal}$ is the value of the light within the effective aperture, as measured by calibrated instrumentation.

$$\Sigma_i V_j^i = V_{jTotal} \quad (4)$$

But from (1), $$\Sigma_i V_j^i = V_{jTotal}$$
$$E_i V_j^i = V_{jTotal} = \rho_j \times V_{cal} \quad (5)$$

From (3), $\rho_j$ is a sensitivity factor applicable to a specific sensor site $S_j$ when integrating over the effective aperture i. Integration occurs in two ways:

by summing relative $V_i$ measurements made by the $j^{th}$ sensor element, and by collection of total light through radiometer/integrating sphere techniques.

From (5), if the absolute value of light collected at an aperture is modified by a sensitivity factor $\rho_j$ to result in a sensor-specific total relative value $V_{jTotal}$, then each portion of the relative total value must also be modified in the same way.

$$V_j^i = \rho_j \times V_{cal}^i \quad (6)$$

Where $V_{cal}^i$ is the $i^{th}$ sub-divided portion of absolute measured radiation as emitted by (E) site$E^i$.

Substituting the value $V_j^i$ from (6) into (2), the ratio measurement of the $i^{th}$ emission site by the $j^{th}$ sensor element becomes:

$$R_j^i = \rho_j \times V_{cal}^i / V_{jTotal} \quad (7)$$

Using the value of $\rho_j$ from (5):

$$R_j^i = (V_{cal}^i / V_{jTotal}) \times \rho_j$$
$$= (V_{cal}^i / V_{jTotal}) \times (V_{jTotal} / V_{cal})$$
$$= V_{cal}^i / V_{cal}$$

And substituting $R_j^i$ from (2):

$$R_j^i = V_{cal}^i / V_{cal} = V_j^i / V_{jTotal} \quad (8)$$

Equation (8) says that the relative ratio, as measured by a specific sensor, is equal to the absolute ratio, as measured by a calibrated sensor integrating the entire aperture in a single measurement. From this we conclude that the ratio of a measured value at an emission site $E_i$ to the total radiation $V_{Total}$, as measured by a specific sensor element $S_j$, is independent of the sensitivities of each sensor element in the sensor.

We claim:

1. A method of calibrating an image sensor having an array of pixel sensor sites, and an area light source having a corresponding array of pixel emission sites, comprising the steps of:
   a. measuring the output of the light source in a first region with a radiometer to generate an absolute measured light value;
   b. identifying a first region of the image sensor corresponding to the first region of the light source;
   c. successively positioning, reading out, and stepping the image sensor with respect to the light source to create a first file of pixel values representing one pixel in the first region of the sensor that has read every pixel in the first region of the source, and a second file of pixel values representing one pixel in the source that has been read by every pixel in the first region of the sensor;
   d. calibrating each pixel in the first region of the light source using the absolute measured light value and the pixel values in the first file;
   e. calibrating each pixel in the first region of the sensor using the calibrated value of one pixel in the first region of the light source and the pixel values in the second file; and
   f. repositioning the sensor with respect to the light source and calibrating an uncalibrated second region of sensor with the calibrated first region of the source, and calibrating an uncalibrated second region of the light source with the calibrated first region of the sensor.

2. The method of calibrating an image sensor and a light source according to claim 1, further comprising the step of repositioning the sensor with respect to the light source and calibrating an uncalibrated third region of the sensor with the calibrated first and second regions of the light source, and calibrating a third region of the light source with the calibrated first and second regions of the sensor.

3. The method of calibrating an image sensor and a light source according to claim 1, wherein:
   a. said step of calibrating said pixels in said first region of said light source comprises:
      i. summing the pixel values in the first file to generate a relative measure light value,
      ii. multiplying each pixel value in the first file by the ratio of the absolute measured light value to the relative measured light value; and
   b. said step of calibrating said pixels in said first region of said image sensor comprises dividing each pixel value in the second file by the calibrated value of said one pixel in the source.

4. A system for calibrating an area array image sensor having an array of pixels, and an area light source, comprising the steps of:
   a. a radiometer for measuring the output of the light source in a first region to generate an absolute measured light value;
   b. aperture means for defining said first region of the light source;
   c. optical means for projecting said aperture onto said image sensor to define a first region of the image sensor corresponding to the first region of the light source;
   d. a translation stage for successively positioning the image sensor with respect to the light source such that at least one pixel in the first region of the image sensor reads every pixel in the first region of the source, and at least one pixel in the source is read by every pixel in the first region of the image sensor, and repositioning the image sensor with respect to the light source such that a second region of the image sensor is positioned with respect to the first region of the light source;
   e. a memory connected to the image sensor for receiving the read out of the image sensor and storing a first file of pixel values representing one pixel in the first region of the image sensor that has read every pixel in the first region of the source, and a second file of pixel values representing one pixel in the first region of the source that has been read by every pixel in the first region of the image sensor; and
   f. signal processing electronics connected to the memory and the radiometer and receiving the absolute measured light value for generating a signal representing a calibration value for each pixel in the first region of the light source using the absolute measured light value and the pixel values in the first file, and for calculating a calibration value for each pixel in the first region of the sensor using the calibration value of one pixel in the first region of the light source and the pixel values in the second file.

5. The system claimed in claim 4, wherein said aperture means is adjustable to define a second region of said light source, said translation stage includes means for positioning said first region of said image sensor with respect to said second region of said light source and said signal processing electronics includes means for producing a calibration value for each pixel in said second region of said light source.

6. The system claimed in claim 5, wherein said signal processing electronics calibrates said pixels in said first region of said light source by summing the pixel values in the first file to generate a relative measured light value, and multiplying each pixel value in the first file by the ratio of the absolute measured light value to the relative measured light value; and calibrates said pixels in said first region of said image sensor by dividing each pixel value in the second file by the calibrated value of said one pixel in the source.

7. An area light source calibrated according to the method of claim 1.

8. An image sensor calibrated according to the method of claim 1.

9. A system having an area light source and an image sensor calibrated according to the method of claim 1.

10. A method of calibrating an image sensor having an array of X pixel sensor regions, the method comprising the steps of:
   a) defining X sensor regions each comprising n pixel sensor sites of the image sensor;
   b) defining and isolating a calibration region of n emission sites of a light source for calibration of the image sensor;
   c) measuring the total light output of the n emission sites in the calibration region to generate an absolute measured light value;
   d) selecting a first sensor region of the X pixel sensor regions comprising n pixel sensor sites of the image sensor;
   e) successively, pixel-by-pixel, positioning, reading out, and stepping a selected one of the n pixel sensor sites of the selected first sensor region with respect to each one of the n emission sites of the light source calibration region to create an emission site data file of n emission pixel values representing the emission intensities of all n emission sites that have been successively exposed to and read by the selected one of the n pixel sensor sites in the selected first region of the image sensor;
   f) calibrating each pixel emission site in the light source calibration region using the absolute measured light value and the n emission pixel values in the emission site data file and compiling a calibrated emission site data file of n calibrated emission pixel values;
   g) successively, pixel-by-pixel, positioning, reading out, and stepping the n pixel sensor sites of the selected first sensor region with respect to a selected one of the n emission sites of the light source calibration region to create a sensor site data file of n sensor pixel values;
   h) calibrating each pixel sensor site in the selected first sensor region using the calibrated emission pixel value of the selected one pixel emission site of the light source calibration region and the n sensor pixel values in the sensor site data file and compiling a first calibrated sensor site data file among X sensor region site data files to be compiled and calibrated; and
   i) successively selecting each remaining sensor region of the X pixel sensor regions comprising n sensor sites of the image sensor and repeating steps g) and h) to compile a cumulative calibrated sensor region site data file comprising Xn pixel sensor values.

11. The method of claim 10 wherein step i) further comprises the steps of:
   j.) incrementally selecting further sensor regions among the remaining of the X sensor regions as a geometrical doubling of the preceding selected sensor region, each further sensor region including an incremental sensor region and the preceding sensor region;
   k) exposing the incremental sensor region of each further sensor region to the previously calibrated emission region;
   l) reading out the multiple of n sensor pixel values from the incremental sensor region and compiling a cumulative calibrated sensor site data file representing a cumulative doubling of the preceding multiple of n sensor pixel values;
   m) defining and isolating a further light source calibration region as a geometrical doubling of the preceding light source calibration region, each further light source calibration region including an incremental light source calibration region and the preceding light source calibration region;
   n) exposing the preceding calibrated sensor region to the incremental light source calibration region;
   o) reading out the multiple of n sensor pixel values from the calibrated sensor region exposed to the incremental light source calibration region and compiling a cumulative calibrated emission site data file representing a cumulative doubling of the preceding multiple of n emission pixel values; and p) repeating steps j)–o) until all X sensor and emission regions are calibrated as represented by cumulative calibrated emission site and sensor site data files comprising Xn emission pixel values and Xn sensor pixel values.

12. A method of calibrating an image sensor having an array of X pixel sensor regions to define a calibrated sensor surface and an associated light source having a corresponding array of X pixel emission regions to define a calibrated emitter surface, the method comprising the steps of:

a) defining X sensor regions each comprising n pixel sensor sites of the image sensor;

b) defining and isolating a calibration region of n emission sites of a light source for calibration of the image sensor;

c) measuring the total light output of the n emission sites in the calibration region to generate an absolute measured light value;

d) selecting a first sensor region of the X pixel sensor regions comprising n pixel sensor sites of the image sensor;

e) successively, pixel-by-pixel, positioning, reading out, and stepping a selected one of the n pixel sensor sites of the selected first sensor region with respect to each one of the n emission sites of the light source calibration region to create an emission site data file of n emission pixel values representing the emission intensities of all n emission sites that have been successively exposed to and read by the selected one of the n sensor sites in the selected first region of the image sensor;

f) calibrating each pixel emission site in the light source calibration region using the absolute measured light value and the n emission pixel values in the emission site data file and compiling a calibrated emission site data file of n calibrated emission pixel values;

g) successively, pixel-by-pixel, positioning, reading out, and stepping the n pixel sensor sites of the selected first sensor region with respect to a selected one of the n emission sites of the light source calibration region to create a sensor site data file of n sensor pixel values;

h) calibrating each pixel sensor site in the selected first sensor region using the calibrated emission pixel value of the selected one pixel emission site of the light source calibration region and the n sensor pixel values in the sensor site data file and compiling a first calibrated sensor site data file among X sensor region site data files to be compiled and calibrated;

i) incrementally selecting further sensor regions among the remaining of the X sensor regions as a geometrical doubling of the preceding selected sensor region, each further sensor region including an incremental sensor region and the preceding sensor region;

j) exposing the incremental sensor region of each further sensor region to the previously calibrated emission region;

k) reading out the multiple of n sensor pixel values from the incremental sensor region and compiling a cumulative calibrated sensor site data file representing a cumulative doubling of the preceding multiple of n sensor pixel values;

l) defining and isolating a further light source calibration region as a geometrical doubling of the preceding light source calibration region, each further light source calibration region including an incremental light source calibration region and the preceding light source calibration region;

m) exposing the preceding calibrated sensor region to the incremental light source calibration region;

n) reading out the multiple of n sensor pixel values from the calibrated sensor region exposed to the incremental light source calibration region and compiling a cumulative calibrated emission site data file representing a cumulative doubling of the preceding multiple of n emission pixel values; and o) repeating steps i)–n) until all X sensor and emission regions are calibrated as represented by cumulative calibrated emission site and sensor site data files comprising Xn emission pixel values and Xn sensor pixel values.

* * * * *